United States Patent
Battlogg et al.

(10) Patent No.: US 10,480,237 B2
(45) Date of Patent: Nov. 19, 2019

(54) DOOR COMPONENT COMPRISING A CONTROLLABLE DAMPER DEVICE

(71) Applicant: INVENTUS ENGINEERING GMBH, St. Anton I.M. (AT)

(72) Inventors: Stefan Battlogg, St. Anton I.M. (AT); Markus Mayer, Sulz (AT)

(73) Assignee: INVENTUS Engineering GmbH, St. Anton I.M. (AT)

( * ) Notice: Subject to any disclaimer, the term of this patent is extended or adjusted under 35 U.S.C. 154(b) by 111 days.

(21) Appl. No.: 15/746,505

(22) PCT Filed: Jul. 21, 2016

(86) PCT No.: PCT/EP2016/067475
§ 371 (c)(1),
(2) Date: Apr. 18, 2018

(87) PCT Pub. No.: WO2017/013236
PCT Pub. Date: Jan. 26, 2017

(65) Prior Publication Data
US 2018/0216694 A1 Aug. 2, 2018

(30) Foreign Application Priority Data

Jul. 21, 2015 (DE) .................. 10 2015 009 449
Nov. 11, 2015 (DE) .................. 10 2015 119 505

(51) Int. Cl.
*F16F 9/53* (2006.01)
*E05C 17/00* (2006.01)
(Continued)

(52) U.S. Cl.
CPC .............. *E05F 15/619* (2015.01); *B60J 5/047* (2013.01); *E05C 17/003* (2013.01);
(Continued)

(58) Field of Classification Search
CPC .......... E05F 15/619; E05F 5/025; E05F 5/00; E05F 15/00; E05C 17/006; E05C 17/22;
(Continued)

(56) References Cited

U.S. PATENT DOCUMENTS 3,747,913 A 7/1973 Savery
3,989,286 A 11/1976 Cleff
(Continued)

FOREIGN PATENT DOCUMENTS

CN 204249966 U 4/2015
DE 3506001 A1 8/1986
(Continued)

*Primary Examiner* — D Glenn Dayoan
*Assistant Examiner* — Melissa A Black
(74) *Attorney, Agent, or Firm* — Laurence A. Greenberg; Werner H. Stemer; Ralph E. Locher (57) ABSTRACT

A door component has a controllable damper device that contains a magnetorheological fluid as a working fluid. Two connection units of the damper device can be moved relative to each other. One of the two connection units can be connected to a support structure, and the other connection unit can be connected to a pivotal door device in order to damp a movement of the door device between a closed position and an open position in a controlled manner. The magnetorheological damper device has a piston unit and a cylinder unit which surrounds the piston unit. The piston unit divides a cylinder volume into two chambers. The piston unit has a first piston rod, which extends through the first chamber, and a second piston rod, which extends through the second chamber.

20 Claims, 4 Drawing Sheets

(51) Int. Cl.
*E05C 17/22* (2006.01)
*E05F 5/02* (2006.01)
*F16D 57/00* (2006.01)
*E05F 15/619* (2015.01)
*F16F 9/56* (2006.01)
*F16F 9/06* (2006.01)
*F16F 9/18* (2006.01)
*F16F 9/20* (2006.01)
*E05F 5/00* (2017.01)
*F16D 57/06* (2006.01)
*F16D 71/00* (2006.01)
*B60J 5/04* (2006.01)
*F16F 9/32* (2006.01)
*E05F 15/00* (2015.01)

(52) U.S. Cl.
CPC ............ *E05C 17/006* (2013.01); *E05C 17/22* (2013.01); *E05F 5/00* (2013.01); *E05F 5/025* (2013.01); *E05F 15/00* (2013.01); *F16D 57/002* (2013.01); *F16D 57/06* (2013.01); *F16D 71/00* (2013.01); *F16F 9/06* (2013.01); *F16F 9/067* (2013.01); *F16F 9/187* (2013.01); *F16F 9/20* (2013.01); *F16F 9/3292* (2013.01); *F16F 9/535* (2013.01); *F16F 9/537* (2013.01); *F16F 9/56* (2013.01); *E05Y 2201/21* (2013.01); *E05Y 2201/218* (2013.01); *E05Y 2201/232* (2013.01); *E05Y 2201/246* (2013.01); *E05Y 2201/254* (2013.01); *E05Y 2201/256* (2013.01); *E05Y 2201/264* (2013.01); *E05Y 2201/434* (2013.01); *E05Y 2201/46* (2013.01); *E05Y 2201/462* (2013.01); *E05Y 2400/20* (2013.01); *E05Y 2400/21* (2013.01); *E05Y 2400/44* (2013.01); *E05Y 2400/45* (2013.01); *E05Y 2400/53* (2013.01); *E05Y 2400/54* (2013.01); *E05Y 2900/531* (2013.01); *F16F 9/063* (2013.01); *F16F 2222/06* (2013.01); *F16F 2222/12* (2013.01); *F16F 2224/045* (2013.01); *F16F 2228/066* (2013.01); *F16F 2230/0005* (2013.01); *F16F 2230/0088* (2013.01); *F16F 2230/18* (2013.01)

(58) Field of Classification Search
CPC . E05C 17/003; F16F 9/535; F16F 9/56; F16F 9/067; F16F 9/187; F16F 9/20; F16F 9/537; F16F 9/3292; F16F 9/06; F16F 9/063; F16F 2222/06; F16F 2222/12; F16F 2224/045; F16F 2230/0005; F16F 2230/0088; F16F 2230/18; F16F 2228/066; F16D 57/002; F16D 57/06; F16D 71/00; B60J 5/047; E05Y 2201/264; E05Y 2400/21; E05Y 2900/531; E05Y 2201/21; E05Y 2201/254; E05Y 2201/462; E05Y 2201/218; E05Y 2201/232; E05Y 2201/256; E05Y 2400/20; E05Y 2400/44; E05Y 2400/45; E05Y 2400/53; E05Y 2400/54; E05Y 2201/246; E05Y 2201/46
See application file for complete search history.

(56) References Cited

U.S. PATENT DOCUMENTS

| 5,468,042 | A | 11/1995 | Heinrichs et al. |
| 6,314,612 | B1 | 11/2001 | Rennecke et al. |
| 8,910,963 | B2 | 12/2014 | Battlogg et al. |
| 2006/0181108 | A1 | 8/2006 | Cleland et al. |
| 2008/0307711 | A1 | 12/2008 | Kern et al. |

FOREIGN PATENT DOCUMENTS

| DE | 19754167 A1 | 6/1999 |
| EP | 0580147 A1 | 1/1994 |
| EP | 2703686 A2 | 3/2014 |
| KR | 20060003272 A | 1/2006 |
| WO | 2004001170 A1 | 12/2003 |

Fig. 11

DOOR COMPONENT COMPRISING A CONTROLLABLE DAMPER DEVICE

BACKGROUND OF THE INVENTION

Field of the Invention

The present invention relates to a door component having a controllable damper device, in particular for a motor vehicle, and to a controllable damper device. Here, the door component comprises two connector units which are movable relative to one another, the movement of which relative to one another can be at least braked by means of at least one controllable damper device. Here, one of the two connector units is connectable or connected to a supporting structure, and the other of the two connector units is connectable or connected to a pivotable door device, and in particular a vehicle door.

In the prior art, a wide variety of door components has become known with which targeted damping of the door movement and in particular also targeted fixing of the door in predetermined angular positions is possible. Normally, for this purpose, use is made of mechanical systems which are inexpensive and which allow the door of a motor vehicle to be secured in two or three angular positions. In this way, the user can move the door into one of the angular positions that appears suitable owing to the present space situation, and can exit the automobile.

A disadvantage of said known mechanical systems is however that the door is fixed only in a certain number of defined angular positions. If there is presently less or even more space available, it may be the case that there is no suitable position.

Active systems have also become known in which the door can basically be braked or fixed in any desired positions. A disadvantage of systems actuated for example by means of a spindle is that these require a relatively long time for the opening or closing of the doors. Systems have also become known which have for example a magnetorheological brake, and in the case of which an electrical coil generates a magnetic field in order to achieve the desired damping action. A disadvantage of such systems is that electrical energy is always required during the imparting of the damping action, which may entail considerable energy consumption for example during a relatively long stoppage in a parking space, for example, with a door open.

A system has also become known in which the magnetic field required for the damping action is generated by means of a permanent magnet. A considerable advantage of this system consists in that the energy consumption is low. It is however a disadvantage that, for example in the event of an accident and a failure of the electrical systems, the door can be moved only with very high force, because a high damping action is generated by means of the permanent magnet. This may be a problem specifically if elderly persons or children are seated in the automobile and they can open the door only with difficulty, or possibly cannot open the door at all.

Hydraulic damping systems in which a piston plunges into a cylinder have a compensation volume for the plunged piston rod volume. In such damping systems, a damping cylinder is normally provided which is divided into two partial spaces by a piston connected to the piston rod. A (controllable) damping valve is provided in the piston. The piston rod and the damping cylinder are respectively connected to the vehicle and to the door. For the compensation for the volume of the inwardly or outwardly moving piston rod, in the damping cylinder, a region in the cylinder is separated off by means of a separating piston which is movable back and forth in the damping cylinder. The separated-off region forms the compensation volume, and is normally filled with a compressible medium such as air, and is subjected to a positive pressure such that complete and problem-free retraction and deployment of the piston rod is possible. The compensation volume which is at positive pressure however also gives rise to the effect whereby the damping system is preloaded into the deployed state, because the positive pressure that prevails in the compensation volume acts on the piston and thus pushes the piston rod into the deployed state. The preload force is defined by the product of acting positive pressure and the piston rod surface area. In this way, a door of a vehicle is preloaded for example into the open position. After the opening of the door lock, the door moves automatically, without further measures, to the maximum opening angle. During the closing process, the door must be moved counter to said preload force. Such a characteristic is not always desired.

SUMMARY OF THE INVENTION

It is therefore the object of the present invention to provide a door component and a method, with which an at least partially improved door component, in particular for a vehicle, can be provided. It is a further object to provide an improved damper device.

Said object is achieved by means of a door component having the features as claimed and by means of a damper device having the features as claimed. The dependent claims relate to preferred refinements of the invention. Preferred features, refinements and embodiments will also be discussed in the general description and in the description of the exemplary embodiments.

A door component according to the invention comprises two connector units which are movable relative to one another, and at least one controllable damper device which comprises a magnetorheological fluid as working fluid damper device. Here, one of the two connector units is connectable to a supporting structure, and the other of the two connector units is connectable to a movable and in particular pivotable door device, in particular of a vehicle. A relative movement of the two connector units with respect to one another can be damped by means of the damper device in order to dampen a movement or pivoting movement of the door device in controlled fashion. In particular, the movement is damped at least partially between a closed position and a normally fully open position. The damper device is preferably controlled by means of a control device. The magnetorheological damper device comprises a piston unit and a cylinder unit surrounding the piston unit the piston unit divides a cylinder volume of the cylinder unit into two chambers. Here, the piston unit has a first piston rod, which extends through the first chamber, and a second piston rod, which extends through the second chamber.

The door component according to the invention has numerous advantages. Said construction permits an embodiment in which practically no forces at all, or at most low forces, preload the door device in one or the other direction. By virtue of the fact that in each case one piston rod extends through the first chamber and through the second chamber, it is possible for the volume of the piston rods within the cylinder unit to remain entirely unchanged during a relative movement of the piston. It is thus then the case that almost no preload forces, or no preload forces whatsoever, act in the opening or closing direction. It is however also possible for a targeted preload to be set for example by means of the shaping and the selected diameters of the two piston rods.

The door component according to the invention makes it possible for a controllable damped door device to be moved in both directions practically without any pressure.

The two piston rods may be separate parts, which are both connected to the piston. The two piston rods may however also each be part of a common continuous piston rod, and thus form two piston rod sections of a continuous piston rod.

In an embodiment with two piston rods or with one continuous piston rod (with two piston rod sections), the piston rods (or ends of the piston rod) are at both ends led out of the cylinder volume and/or the cylinder unit to the outside.

If, for example, a continuous piston rod is used, the volume does not change as a result of the relative movement of the two connection units with respect to one another, and there is therefore no need for a compensation device or a compensation volume to be provided for the volume of the piston rod. In such cases, too, however, a (small) compensation volume may be advantageous in order, for example, to provide compensation in the presence of fluctuating temperatures (temperature compensation). Such a compensation volume may be referred to as temperature compensation volume. The compensation volume is in particular small in relation to the volume of the piston rod. The compensation device preferably comprises a compressible compensation volume. A compensation volume of said type may be formed by a sponge-like structure, a rubber bladder or a closed-off and flexible air vessel.

The compensation volume of the compensation device is preferably smaller than the volume of the first piston rod and of the second piston rod of (within) the cylinder unit. In particular, the compensation volume of the compensation device is smaller than the volume of the first piston rod or of the second piston rod of the cylinder unit. It is preferable for the compensation volume of the compensation device to be less than ½ or ⅓ or ¼ or ⅙ or ⅛ of the volume of the first piston rod and/or of the second piston rod of (within) the cylinder unit.

The compensation volume of the compensation device is preferably smaller than the maximum volume of the first piston rod or of the second piston rod situated within the cylinder unit during operation.

The piston rods are in each case sealed off with respect to the cylinder unit and/or the damper device at the exit from the cylinder unit and/or the damper device respectively.

It is however also possible for one of the piston rods to be of telescopic form, and to be fastened at one side to the piston and fixedly connected at the other side to the cylinder unit. The telescopic parts of the telescopic piston rod are in particular sealed off with respect to one another. In such an embodiment, there is likewise no need for volume compensation for the plunging of the piston rod. Temperature compensation is preferably provided.

The door can be moved in both directions practically without any pressure.

At the same time, if required, by means of a fast adjustment of the magnetic field, a maximum damping force can be set in order to prevent or reduce damage to trapped body parts.

In all embodiments, the door component may serve for damping a movement or pivoting movement of the movable door device, and in particular of a door, between the closed position and an arbitrary open position. For example, the door component with the damper device may dampen the movable door device in a controlled manner over the entire possible range of motion and in particular pivoting range. It is however also possible for damping of a pivoting movement to be realized only in certain angular ranges or at certain angular points or positions.

It is particularly preferable for the door device to be designed as a door and to be pivotably accommodated on the supporting structure. In such embodiments, the door device can be referred to as a door. It is for example also possible, on a vehicle, for a rear hatch, a rear lid or for example an engine hood as a door device to be damped in targeted fashion during the opening and/or closing movement. Although the expression "door" will generally be used below, the expression may also be replaced throughout by the expression "door device" or by "hatch" or "lid".

It is also possible to use a sliding door as a movable door device. It is then possible for targeted damping of the movement to be performed over a part of the opening or closing travel or over the entire sliding travel or at defined points.

Here, the expression "damping" is to be understood to mean damping of a movement, which may also be referred to as braking. This means that the damper device may also be referred to as a brake device. The damping of the movement may lead to fixing of the connector units that are movable relative to one another, and thus of the movable or pivotable door, such that the door device is fixed in a particular position/angular position and can be moved from there only by means of a particularly high force, which exceeds the maximum force of the damper device.

It is preferably possible for the movement of the connector units relative to one another to be blocked in controlled fashion by means of the damper device. The damping valve is preferably damped in controlled fashion by means of a control device. In particular, the movement of the door device is damped in controlled fashion by means of a control device.

In all embodiments, it is preferable for the first and the second piston rod to each have the same diameter. It is however also possible for the two piston rods to each have a different diameter and/or a different shape. For example, by means of a corresponding diameter ratio, a corresponding preload force can be set for the retraction or deployment.

The damping valve preferably has at least one flow channel (or multiple flow channels) through which a magnetorheological liquid can flow, wherein the flow channel can be subjected to a variable magnetic field. In this way, the flow resistance of the flow channel and thus a damping action of the damper device can be influenced by means of the magnetic field in the flow channel. A more intense damping action is obtained in the presence of an intense magnetic field than in the presence of a weak magnetic field.

It is preferable for at least one of the two piston rods to serve as an electrical connector unit. It is then possible for at least one connector cable to be guided on the piston rod. It is also possible for connector cables to be guided on or in both piston rods. The connector cables or the connector cable may be guided in or on the piston rod. It is possible for the required electrical current to be supplied via a cable, and for signals to be transmitted in a manner modulated thereon.

It is preferable for at least one of the two piston rods to be received, outside the cylinder unit, in displaceable fashion in a tube part or tube equipped with at least one slot. It is then preferable for the connector cable to be guided out in the slot. The tube part is preferably a constituent part of, or fixedly connected to, one of the connector units. The piston rod guided in the tube part is thus protected against external influences. The piston rod guided in the tube part is preferably subjected to (practically) no compression or tension loading during operation. The piston rod guided in the tube part is not fixedly connected to one of the connector units. The tube part is fixedly connected to one of the connector units. The other piston rod (on the other side) is fixedly connected to the other of the two connector units.

In a preferred embodiment, the magnetorheological damper device has a piston unit and a cylinder unit surrounding the piston unit, wherein the piston unit divides a cylinder volume of the cylinder unit into two chambers. Here, the piston unit is equipped with a first one-way valve. In this embodiment, an external magnetorheological damping valve is provided which is arranged outside the piston and in particular also outside the cylinder unit. Here, the two chambers are connected to one another, by means of an external return channel which is equipped with the or at least one controllable magnetorheological damping valve, so as to form a one-way circuit such that the magnetorheological fluid flows in the same flow direction through the piston unit during the retraction and deployment of the piston unit. This means that the same flow direction exists through the first throttle valve and through the damping valve.

In this construction, it is also again the case that a continuous piston rod is provided, or two piston rods lead through the cylinder unit at the different sides of the piston. In this case, too, only low forces or no forces whatsoever preload the door device in one or the other direction.

It is preferable for a first chamber of the two chambers to be connected to the damping valve and for the damping valve to be connected in terms of flow to the second chamber by means of a second one-way valve. Here, the connection in terms of flow may be realized in each case indirectly or directly. The second one-way valve preferably permits only a flow into the second chamber. The first one-way valve permits only a flow from the second chamber through the piston into the first chamber.

In all embodiments, it is preferable for the damping valve to maintain its set state when electrically deenergized, in order for a damping characteristic of the damper device to be permanently set as required by means of an electrical adjustment of the damping valve.

A particular advantage then consists in that the damping valve maintains its set state even when it is switched into an electrically deenergized state. In the context of the present invention, the expression "electrically deenergized" is to be understood to mean a state in which the damping valve and possibly also the damper device is largely or substantially or entirely electrically deenergized. A—very low—current demand may however continue to exist for the purposes of maintaining the control function and possibly for the recording of sensor data. Therefore, in the context of the present invention, "electrically deenergized" means that, on average, only an extremely small fraction of the normal current demand of the damping valve is required. Consequently, an electrically deenergized state is to be understood to mean a state of the damping valve in which the damping valve itself requires less than one percent and in particular less than one tenth of a percent or less than 0.1 tenths of a percent of the current demand when it is electrically adjusted. The damping valve particularly preferably maintains its set state when fully electrically deenergized.

The fact that the damper device comprises at least one magnetorheological damping valve yields considerable advantages, because the magnetorheological damping valve can change its state in an extremely short period of time. Furthermore, it is possible in contactless fashion, and without a mechanical drive, for a magnetic field to be generated which influences the magnetorheological damping valve and thus adjusts the damper characteristic of the damper device.

In all embodiments, the door component may for example be designed as, or comprise, a driver's door or front passenger door or other vehicle door. In the context of the present invention, a "door" of a door component is however also to be understood to mean a pivotable hatch or hood such as a front or rear lid of the vehicle such as a rear hatch or an engine hood.

In preferred refinements, the magnetic field is permanently generated, or can be generated, by means of a magnet device composed at least partially of magnetically hard material. The magnet device preferably acts (without external control influences) as a permanent magnet which permanently maintains its magnetic characteristics. The magnetization of the magnet device can be permanently changed by means of at least one magnetic pulse of at least one electrical coil. In this way, the magnetically hard material (in the context of its material characteristics) can be arbitrarily and in particular permanently magnetized. A magnetic pulse of an electrical coil of very short duration is sufficient for the magnetization. Here, the magnetic pulse is preferably shorter than 1 second and in particular shorter than 50 ms and shorter than 10 ms, and may even be considerably shorter. The magnetically hard material of the magnet device reacts practically immediately to a concentrated magnetic pulse, and changes its magnetization in particular permanently in a manner dependent on the magnitude and the duration of the pulse. In any case, the magnet device maintains the magnetic characteristics set by means of the pulse for a time period which is longer than the time duration of the pulse. In particular, the magnet device maintains the magnetic characteristics set by means of the pulse for a time period which is several times longer than the pulse. The ratio is preferably greater the 2, greater than 10 and in particular greater than 1000. If it is sought to reverse the magnetization of the magnet device, this may be realized by means of a magnetic alternating field with decreasing amplitude generated by means of the electrical coil, or by means of a targeted counter-pulse. In this way, the magnetically hard material can be demagnetized again, and can subsequently be arbitrarily magnetized again by means of a targeted magnetic pulse.

Through the use of a magnet device which is composed at least partially of a magnetically hard material, it is thus possible for a particular magnetic field, which provides the desired damping action of the damper device, to be permanently maintained even without a supply of electrical current.

This means for example that, during a stoppage in a parking space and in the case of a door device or door being open for a relatively long period of time, a corresponding magnetic pulse can be generated. The desired damping is subsequently provided permanently without a further supply of electrical current. The door device (door) may even be fixed in the present angular position. After the transfer into the closed position, the magnetization can be "deleted" by means of a corresponding magnetic alternating field, such that no or only a very slight magnetic field acts on the damping valve of the damper device. The magnetization of the magnet device after a closing process has taken place is preferably always set to a minimum or very low value. This has the considerable advantage that, in the event of an accident, the (vehicle) door continues to exhibit free movement, and can be easily opened even by children or elderly persons.

In all embodiments, it is preferable for at least one sensor device to be assigned for detecting a measure for an (angular) position of the pivotable door. In this way, position-dependent and in particular angle-dependent or angle-optimized control is possible. It is preferable for the sensor device to comprise at least one wheel or in particular friction wheel, by means of which a measure for a relative movement of the two connector units with respect to one another can be detected. Here, it is in particular the case that the (friction) wheel lies on the piston rod and is set in rotation as a result of the longitudinal movement of the piston rod during the relative movement of the two connector units with respect to one another. The wheel or friction wheel is preferably connected to a rotary encoder. An advantage here is that a rotational travel measurement is less expensive than a linear travel measurement. The same sensor/magnet ring/encoder can be utilized over several rotations.

Assuming a relatively high resolution, a linear travel measurement can be implemented less expensively. Other linear measurement systems or sensor devices, which are for example not based on magnetic encoders, are also conceivable. An absolute travel measurement system may also offer advantages. An absolute travel measurement system is rotationally relatively difficult to construct, because it requires a large wheel diameter, because in general only one rotation is admissible. It is also conceivable for two wheels (of different size) to be used. The absolute position can be determined from the two individual positions.

An expedient embodiment and reliable implementation are made possible by an incremental travel measurement system, which is in particular supplemented with additional position information. Index pulses at particular positions may for example be advantageous. This may be a single index for example shortly before the end of the stroke, or else even a sensor provided in the door device or door (for example door closed). An advantage here is that "miscounting" by the sensor device is no longer critical; the sensor device finds its place again at defined positions. Miscounting would be possible for example in the event of slippage, or if for example the supply fails when the door device or door is open (battery change).

In preferred refinements, the control device is configured and designed to set the damping valve to a low (or relatively low) damping action, which acts in an electrically deenergized state, in the closed position of the door device (door). The control device is preferably configured and designed to set the damping valve to an intense (or relatively intense) damping action, which acts in an electrically deenergized state, after a predefined time period has elapsed. The relatively low damping action, which acts in an electrically deenergized state, in the closed position offers considerable safety advantages. The intense damping action, which acts in an electrically deenergized state, in an open position is advantageous if the user holds the door device (door) open for a long period of time. Then, in the case of an active system, energy is continuously required in order to maintain the damping action. With the present invention, only a one-off magnetic pulse is required, which subsequently ensures damping or fixing of the door for an arbitrarily long period.

This preferably means that the control device is configured and designed to set the damper device to a low (relatively low) actuation force, which acts in an electrically deenergized state, when the door is in the closed state, that is to say in the closed position. In particular, the control device is configured and designed to set the damper device to a high (relatively high) actuation force, which acts in an electrically deenergized state, when the door is open and after a predefined time period has elapsed. In particular, when the door is closed, the damper device or the damping valve is electrically deenergized and set to a low damping action. During a movement of the door, a low damping action is generally set in order to allow the user to freely open the door. When the open door remains in a particular state, a relatively high damping action is set by means of a magnetic pulse and the remanence of the magnet device.

The control device is preferably configured and designed to set the damping valve to a low damping action, which acts in an electrically deenergized state, during the movement of the door.

In all embodiments, it is preferable that the magnetic field acting in the flow channel can be modulated by means of an electrical coil. This means that, for example in the case of a door open for a relatively long period of time, a permanently acting magnetic field can be set by means of a magnetic pulse. If the door is then for example moved slowly into the closed position by the user, an oppositely acting magnetic field is generated by means of an electrical coil, such that the actually acting magnetic field in the damping channel of the damping valve is reduced, and thus the door can be pivoted freely.

Here, it is possible for the electrical coil for modulating the magnetic field to also be used for generating the magnetic pulse. It is however also possible for at least two electrical coils to be used, of which one is used for example for generating a magnetic pulse for the permanent magnetization. The other electrical coil may then be used for example for modulating the permanent magnet.

It is alternatively or additionally possible for at least one mechanically adjustable hydraulic valve to be provided as a damping valve. For example, a motor-adjustable hydraulic valve may be provided, which can be transferred from an open position into a partially or fully closed position by means of an associated electric motor. It is also possible by means of a mechanically adjustable hydraulic valve of said type to maintain a low damping action in an electrically deenergized state, or to maintain a relatively intense damping action in an electrically deenergized state. In this case, electrical current is required only in order to open the mechanically adjustable hydraulic valve to a corresponding extent, or to close said mechanically adjustable hydraulic valve.

In preferred refinements, it is possible for the magnetorheological damping valve of the damper device to be electrically set as required, and for the set damping characteristics to be permanently maintained in an electrically deenergized state.

This is advantageous, because this method permits reliable damping with little energy use in a simple manner.

A measure for the position/angular position of the door device/door is preferably detected, and the damper device is set to a low damping action, which acts in an electrically deenergized state, in the closed position of the door. It is preferably the case that, in the open position, the damper device is set to a high damping action, which acts in an electrically deenergized state, at least if the door has not moved significantly over a predefined time period.

In all embodiments, it is possible for a pivoting movement of the door to be damped in controlled fashion at least partially between a closed position and an open position. Here, a measure for a change in the movement speed of the door device or for a change in the rotational speed of the door can be determined, and, in the event of a change beyond a predetermined threshold value, a switch can be made from a presently set relatively low damping action to a relatively high damping action.

Such a method has numerous advantages. Said method permits safer operation of a door component. Here, the rate of change of the rotational speed is to be understood to mean the mathematical derivation of the rotational speed, that is to say the acceleration or the deceleration. This means that, in the event of an excessive change in the movement speed or rotational speed, the controller intervenes in the damping characteristic of the damper device. Here, the mathematical magnitude of the rate of change is taken into consideration. The threshold values for deceleration and acceleration may be equal, though preferably differ.

This makes it possible for a relatively high damping action to be set practically immediately in the event of an intense deceleration of the door, in order to as far as possible prevent or at least reduce or minimize damage. For example, if a door of a motor vehicle is moved in a closing direction as a result of a gust of wind or as a result of some other action, and if for example a leg or a hand or some other object is situated in the path of the closing movement, then the door initially—without further sensors—strikes the object and is unexpectedly braked in the process. This means that, for example in the case of a relatively high rotational speed of the door, an unexpected change in the rotational speed occurs. This means here that the rate of change of the rotational speed exceeds a predetermined threshold value. The invention now makes it possible, in the event of such a process being detected, for a relatively high (and in particular maximum) damping action to be set immediately in the event of such a process being identified, such that damage can altogether possibly be avoided entirely, or at least considerably reduced.

For example, during the opening of the door, the door may strike with the flat body panel against a for example blunt obstruction, which immediately reduces the rotational speed of the door. Since the body panels can generally deform resiliently elastically over a small range, it is thus possible, in the case of an immediate action, for damage to possibly be prevented entirely.

This means that the deceleration of the door is preferably determined and that a deceleration of the rotational speed beyond a predetermined threshold value, the damping is switched from a relatively low value to a high damping action. For this purpose, it is the case in particular that the speed or the rotational speed of the door is monitored.

In all embodiments, during the closing process, it is for example possible in all cases for the door to be braked when a small angle is reached, in order to thereby achieve a smooth or soft closing action. Such a small angle is for example 15° or 10° or 5° or 2.5°. In the case of sensor-based identification of obstructions, braking can be correspondingly performed in advance.

In preferred refinements, the damping is preferably set to a substantially maximum value or to the maximum value if the rate of change or deceleration exceeds the predetermined threshold value.

In particular if a magnetorheological damping valve of the damper device is used, it is thus possible to achieve a very fast reaction of the system. Magnetorheological damper devices can completely change their setting within a few milliseconds, such that a time period of only a few milliseconds elapses from a state of minimum damping to a state of maximum damping. This means that, during actual closing movements, the door can be fully braked within less than 5 mm and in particular less than 2 mm and preferably less than 1 mm and, in advantageous embodiments, in approximately 0.6 mm. In the case of such rapid braking processes, it is possible in many cases to avoid considerable damage, even if the user jams for example implements or objects such as computers, or a body part such as a finger, a hand or other limbs, in the door.

The damping action is preferably increased when the door approaches at least one predetermined angular position. This may for example be a predetermined open position. The damping action is preferably increased when the door approaches the closed position. For example, at a particular angular value of 15°, 10° or 5°, the damping may be intensified to such an extent that continuous and gradual braking is realized.

The damping action is preferably increased such that the rotational speed of the door during a closing movement is reduced to a predefined closing speed. The closing speed is in particular predefined such that smooth closing is performed, with preferably little generation of noise.

In all embodiments, it is preferable for at least one learning function to be integrated, with which closing speeds during closing processes are evaluated. In this way, the predefined closing speed is preferably adapted if it is found that, during preceding closing processes, the door was no longer moving sufficiently quickly for a closing process. The closing speed is set such that a speed that is just sufficient leads to reliable closing.

In preferred refinements, the damping action is preferably increased when the door approaches a maximum open position.

In all embodiments, the damping action is preferably increased only if the rotational speed exceeds a predefined rotational speed. In this way, it is for example possible to prevent the damping action being increased during the closing process despite the user guiding the door by hand.

In all embodiments, it is possible for at least one sensor to be assigned which identifies when the user touches the door.

The increase of the damping action is preferably performed only if the rotational speed exceeds a predefined rotational speed. In this way, it is also possible for unnecessary actions to be avoided, for example in the event of measurement errors, noise or at extremely low speeds, such as are caused for example as a result of oscillations of the door. For example, at a speed of 0.01 degrees/s or a speed of 0.1 cm/s at the door handle, there is generally no need for braking of the door to take place.

In all embodiments, the damping action is preferably increased if an obstruction is identified in the movement path of the door and a collision of the door with the obstruction is in particular immediately impending. Corresponding smooth braking until the obstruction is reached is preferable. For the automatic identification of obstructions, use is preferably made of known sensors. In particular, ultrasound-based sensors, radar-based sensors and/or optical or acoustic sensors are used.

The damper device is advantageously controlled such that the rotational speed profile of the door is such that quiet closing of the door is achieved and/or that a certain opening angle is reached without abrupt changes in speed. The control is performed in particular such that the desired functions (desired opening angle, stoppage before an obstruction, standstill at an end stop) are realized as desired. In combination with the fast switching of magnetorheological damping valves, it can thus be achieved that the speed of the door for example during the closing process is as low as possible already shortly before the closing. The damper device thus requires less residual energy.

In further preferred embodiments, the door component comprises at least one sensor device, or is assigned at least one sensor device, for detecting a measure for an angular position of the pivotable door. The control device is configured and designed to determine a characteristic value for a rate of change of the rotational speed of the door using sensor data of the sensor device, and to switch the damper device from a relatively low damping action to a relatively high damping action in the event of a rate of change beyond a prior threshold value.

In this embodiment, and also in all other embodiments, the damper device may also be referred to as a brake device or as an immobilizing device.

The damper device is preferably designed as a magnetorheological damper device, and the damping action can in particular be set by means of a variable magnetic field. A magnetorheological damper device has considerable advantages, because it permits extremely fast switching of the damping action from low to intense values and vice versa. The time duration for switching from the relatively low damping action to the relatively high damping action is preferably less than 50 ms. In particular, a switch from a minimum damping action to a maximum damping action and vice versa can be achieved in less than 20 ms and preferably in less than 10 ms and particularly preferably in less than 5 ms. By means of such an extremely rapid system, it is possible to react to all demands flexibly and in real time.

The damping is particularly preferably set to a substantially maximum value if the rate of change exceeds the predetermined threshold value.

The damping can be deactivated or set to a low value if the rotational speed has been reduced to 0. Here, a speed of 0 is also to be understood to mean an extremely low residual speed which arises for example as a result of oscillations, such that minimal speeds in one and the other direction of rotation arise constantly and in alternation.

The damper device preferably comprises at least one controllable flow channel which is filled with a magnetorheological liquid, wherein the flow channel can be subjected to a variable magnetic field, such that the flow resistance of the flow channel and thus a damping action of the damper device can be set to a more intense value by means of a relatively intense magnetic field in the flow channel and to a relatively weak value by means of a relatively weak magnetic field. In all embodiments, it is preferable for the damper device to comprise at least one sensor device, wherein in particular, a part of the sensor device is fastened to or interacts with the piston rod. In the case of such a sensor device, a measure for a movement of the door device or a pivoting movement of the door is detected by means of a linear movement of the damper device. Since there is a unique assignment between position/angle and linear position, it is possible for the position/pivoting position of the door device/door to be inferred from the absolute position of the piston rod relative to the cylinder unit. Correspondingly, a movement speed of the door device/rotational speed of the door can be inferred from the signals of the sensor device. Also, a slowing of the acceleration of the door movement can be inferred from the signals of the sensor device. As a sensor, use may be made in particular of a wheel or friction wheel which bears for example against the piston rod and which detects a relative movement of the piston rod. Such a friction wheel may in particular lie, by means of the tube part equipped with a slot, against the piston rod.

In all of the above-described embodiments, it is preferable for the door component to comprise the door. It is also possible for the door component to comprise the supporting structure.

The sensor device preferably detects a measure for a pivot angle of the door and/or a measure for the relative position of the connector units with respect to one another.

In all embodiments, it is preferable for at least one position sensor to be assigned which detects a measure for a horizontal orientation or a measure for a deviation from the horizontal orientation of the vehicle. Then, the control device can control the damping action of the damper device in a manner dependent on the deviation from the horizontal orientation. It is for example expedient for an open door to be damped differently if the vehicle is standing on a steep slope and there is the risk of the door falling closed or, in the case of a different orientation of the vehicle, falling open.

In all embodiments, it is also preferable for at least one load sensor to be assigned for detecting a load applied to the door. With a load sensor of said type, it is for example possible to detect a bending moment applied to the door.

It is furthermore preferable for at least one near-field sensor to be assigned, or for the signals of a near-field sensor to be used, for identifying obstructions in the surroundings.

In all embodiments, it is possible for a virtual raster to be generated by means of the control device such that, during the opening or closing of the door, the user senses raster points at particular angular steps of for example 5° or 10°, or other distance steps, as the user is opening or closing the door.

From a "failsafe" aspect, the door component offers considerable advantages. An important point is also that the failsafe characteristics can be configured such that the door can be opened easily and with little force in the event of an accident. Here, for opening, only the basic damping should be overcome.

In the case of conventional systems, this is a problem. If a low basic force is generated in an electrically deenergized state, then a large amount of electrical current is required for the high holding force (damping force). In the event of an accident, the door can thus be easily opened. However, if the vehicle is stationary with a door open for a relatively long period of time, for example on a gradient, then a large amount of current is required for holding the door. If the vehicle stands overnight in this state, then the battery is empty in the morning. A continuous consumer, of which there are in some cases even 4 (four doors), is not practicable. Many vehicles already now switch off the engine and the consumers after a few minutes.

By contrast, if the high basic force is generated in an electrically deenergized state (for example by means of a permanent magnet), then the door can no longer be opened in the event of an accident. In particular if children are seated on the rear seats or if persons are injured, the doors must be able to be opened with minimal force.

One solution would be to use a permanent magnet to generate not the full damping force, which in turn may be critical in the case of children in the event of an accident (movement still too difficult) or in the case of an inclined parking position (holding force is not sufficient).

A further solution would be an electrical current store which reduces the high holding force after the accident. A disadvantage is the high cost. A further disadvantage is that, even with this, it cannot be ensured that this will still function correctly after an accident or can provide the required current for long enough (it must also still detect the opening).

The invention offers an optimum solution here.

A further advantage is that the door can be moved by the user into any desired position with regard to the opening angle. This may be realized by the user guiding the door in continuous fashion until the desired final angle is reached or by way of a striking action by the user.

The detent function of the system then holds the door at the corresponding opening angle. Here, it is of no importance whether the vehicle as a whole is standing on a horizontal or inclined plane. The user however has the possibility of subsequently opening or closing the door further proceeding from said detent function. One conceivable enhancement of the detent function comprises that the door can be moved away from the rest position of the detent function more easily in an opening direction than in a closing direction (unilaterally acting actuator). This is the case both on a horizontal and on an inclined plane. In general, for this purpose, it is necessary to identify the "demand" for an opening or closing process by the user.

It is possible:
- If the door is pushed against, there is a resulting specific load moment. Depending on magnitude, this causes a movement of the door. This may be identified/measured by means of suitable sensors (for example travel, speed, acceleration) at suitable locations (at the actuator, at the center of rotation of the door, at the door handle etc.). Here, if a particular threshold value is exceeded, the opening or closing process is/may be initiated.
- If the vehicle is situated on an inclined plane, then increased load moments/basic moments arise in the detent position owing to the masses acting on the damping system. This is preferably correspondingly taken into consideration, for example by means of an increase of the threshold values for the triggering of an opening or closing process. The adaptive adaptation of the threshold values may be realized using the information regarding the vehicle inclination, which can be easily detected by sensor means.
- A further possibility for identifying an opening or closing process is the use of contact or distance sensors of any type on the outer and inner shells of the door (capacitive, inductive, optical sensors; seat detection sensor (is the user situated on the seat or not)). It is thus possible, if a hand or an object is approaching or in the event of contact with the hand or other objects, to identify whether an opening or closing process should be permitted.

Furthermore, the processing of the information may be performed in near-field detection systems.

All of the abovementioned items of information may also be used to identify whether the user wishes to use the door as a disembarking aid. In this case, too, it is of crucial importance whether the vehicle is situated on a horizontal or inclined plane. This can be taken into consideration correspondingly to the abovementioned methods.

Smooth opening and closing of the door is preferably made possible.

The detent function can be utilized such that, if the door is pushed open or pushed closed or guided in one of the two directions by the user, a smooth movement to the desired door angle always occurs. During the closing of the door, for example, the door would always come smoothly to a standstill at a defined opening angle. During the closing, mechanical or electromechanical components then later perform the final closing and fixing of the door. This is likewise the case during the opening of the door; regardless of the momentum/the impulse/the initial speed/the guiding force to which the door is subjected, smooth opening to the desired opening angle always occurs.

The desired opening angle may in this case be:
- the maximum opening angle. Here, owing to the smooth opening process that is ensured permanently under all circumstances, aside from the comfort, it is also ensured that the maximum torque acting at the maximum opening angle is limited such that a plastic deformation or fundamental overloading of the AB pillar can be avoided. This is the case both for load situations in which the vehicle is situated on a horizontal plane and those in which it is situated on an inclined plane.
- any angle within the working range.

Said desired opening angle may vary on the basis of:
- manual user definitions or
- automated functional enhancements, as described for example in the next bullet point.

Furthermore, wear can be minimized as a result of a smooth opening or closing of the door, by minimization of load peaks or through avoidance of wear-increasing working ranges.

It is possible to provide a virtual stop on the basis of obstructions in the working range (possible maximum opening angle of the door):

By means of suitable sensor equipment or from information from the near-field detection, it can be identified whether an obstruction is situated in the working range of the door. For the near-field detection, it is possible here to use for example camera systems (under the door sill or top view) or similar systems; furthermore, it is for example possible to use distance sensors etc. A virtual stop can be implemented on the basis of said information. Here, the maximum permitted opening angle is calculated/defined on the basis of the abovementioned information from the location of the obstructing object. On the basis of the new maximum possible opening angle, the functions described above (in all preceding points) are implemented with a reduced opening angle. It is also conceivable here for a safety distance to be taken into consideration in addition to the maximum possible opening angle. It is furthermore possible (but not imperative) that, after the safety distance to the obstructive object is reached, a raster function with any characteristic/granularity may be stored, with which a finely incremented approach into the immediate vicinity of the obstructive object is made possible.

It is also possible for a blocking function to be implemented which intervenes if objects of any type approach the working range of the door (for example approaching cyclists) before said door is opened/intended to be opened. The information may be generated on the basis of suitable sensor equipment or on the basis of information from the near-field detection. The system processes said information such that an opening of the door is prevented on the basis of the adaptive damping.

A further advantage of the implementation with MRF actuators is that on the basis of the adaptivity, environmental influences of all types can be reacted to:
- Wear phenomena in the system (for example increased door friction with increasing age, etc.).
- The temperature dependency of the door friction can also be compensated. It is thus possible for the temperature at the door mounting points to be taken into consideration.

External influences can be compensated. The action of wind can thus be compensated. It is for example also possible for a snow load on the rear hatch to be compensated.

Loading (if multiple persons are seated in the vehicle, the ventilation of air from the interior space no longer functions as effectively).

Windows open or closed: in the case of open windows, the doors can be closed more easily.

Vehicle ventilation system: owing to aging, this can become blocked, whereby the closing of the doors becomes more difficult.

Vehicle is situated on an inclined plane (increased forces owing to the masses involved).

Disturbance variables in general, regardless of their nature.

On the basis of all of the influences mentioned above, the behavior of the system changes in relation to the basic state/with aging/with time/on the basis of temporary circumstances (for example inclined plane). Said influences can however at best be detected and taken into consideration.

The detection is performed by means of (intelligent) algorithms which observe the system behavior, in conjunction with suitable sensor equipment. The control strategies—also described in all points above—may be adapted such that the system behavior as a whole always remains constant, or is always perceived as constant by the user.

The door ideally always closes smoothly and with a full sound. For this purpose, the movement speed is correspondingly controlled. If for example the door seals change (swell up . . . ), the automobile is distorted (after an accident, or one wheel is standing on the sidewalk), or the hinge has increased friction shortly before the closed position, the required closing force changes (it becomes greater).

The possibility of the adaptive adaptation of the damping yields several possibilities for increasing the comfort or increasing the performance, etc.:

By means of suitable sensor equipment or on the basis of the information from the near-field detection, or for example by means of a sensor in the key with personal information or by means of cameras situated in the vehicle, it is for example possible to identify which driver is situated as the user at the system. In this way, the characteristics of all of the above-described functionalities can be adapted to the present user (for example adaptive damping of the moment for identifying the "demand" for an opening or closing process; for example male/female distinction).

It is furthermore possible, on the basis of the adaptation of system parameters of the control, to react adaptively to all circumstances without the need to perform any mechanical adaptations during operation or during manufacture front doors/rear doors different vehicle model With a simple configuration of the system, it can be achieved that, for example, both rear doors cannot be opened during travel, or else in a standstill state. This may also be performed dynamically in a manner dependent on the users situated on the rear seat bench. This may be identified by means of suitable sensor equipment or on the basis of the information from the near-field detection or for example by means of a sensor in the key with personal information or by means of cameras situated in the vehicle.

In general, the opening of the doors can be prevented during travel, or permitted only below certain vehicle speeds, or permitted only with increased difficulty.

Alternatively, if the door is opened during travel, a suitable damping measure can be initiated (for example blocking of the door against swinging back after the braking process).

Antitheft protection: The above functions may also be used for antitheft protection (undesired embarking and disembarking is no longer possible). A further advantage here: it is thus also not possible for any articles to be stolen from the vehicle (only by breaking the windows).

In the event of unspecifiable obstructions being detected in the working range (for example light snow) from the general sensor equipment or from information from the near-field detection, the system should for example provide an adapted opening of the door. In the case of such uncertainties, it would for example be possible for the system to provide a finely graduated raster function from the start of the opening process. Thus, by means of the automatically generated haptic feedback, the user is provided with the feedback that unassignable obstructions (which have only a limited damaging effect) are situated in the working range.

Furthermore, aside from a maximum opening angle based on obstructions in the working range for the opening process of the door, it is likewise possible for a maximum closing angle based on obstructions in the working range for the closing process to be taken into consideration (virtual end stop during the closing movement). It is thus possible for not only damage to articles on the vehicle (owing to obstructions such as for example beverage crates) during the closing process but also injuries to persons, for example trapping of fingers or hands, to be prevented. In general, however, painful/injurious trapping of for example fingers/hands is assisted already by the comfort function of the smooth closing. This is because said function already brings the door to a standstill in all situations with little residual energy (residual speed) before the detent function.

Anti-trapping protection: Here, an algorithm or a control regime can abruptly apply a high electrical current to the actuator in the event of an unusual speed reduction shortly before the closed door position, such that said door is in particular braked as quickly/intensely as possible. The fast reaction time of the actuator is highly expedient here. A movement speed of 0.5 m/sec equates to 0.5 mm/ms, and thus, in the case of a reaction time of 6 ms, the door component comes to a standstill within 3 mm.

Damage minimization: the sensor equipment identifies no obstruction, and it is intended to open the door in unhindered fashion. The travel sensor monitors the opening and identifies an atypical movement (for example intense braking owing to an undetected obstruction such as a low post in the center of the door). The "MRF emergency stop" imparts a full braking action (as described above with reference to "anti-trapping protection"; a movement speed of 0.1 m/sec=0.1 mm/ms; in the case of 6 ms, it takes 0.6 mm to come to a standstill) and, owing to the very fast reaction time, thus reduces the damage (the body panel is possibly only elastically deformed as a result . . . ).

This is also important in the case of snow, bushes, branches, etc., that is to say obstructions that are difficult to detect.

Various circumstances of environmental influences can be taken into consideration. For example, a situation may arise in which, when the user is absent from the vehicle, a further vehicle parks adjacent to the user's vehicle, which vehicle was not present when the user departed. In this case, it should be ensured that the general sensor equipment, or the information from the near-field detection before the opening of the door, transmits the maximum opening angle to the SDS system in good time. If said value before the opening of the door is not adapted (for example if the final value before the user departed the vehicle is used), then damage may occur in some form. For example, it will become necessary to find concepts which continuously update such information (even during "non-operation" of the vehicle). This may be realized for example by means of reduced processing (for reduction of the energy requirement) of the corresponding sensor equipment and/or algorithms and/or near-field detection systems in the form of a stand-by function. It is in any case preferable that this is performed before the initial actuation of the door; the advance time is in this case dependent on the performance of the algorithms/sensor equipment that determine(s)/measure(s) the maximum opening angle. It is preferable for obstructions to be newly detected upon actuation of the door lock.

Sensors may be used inter alia on the exterior mirror, on the door sill, under the body panel, on the inside or on the outside. The sensors may be attached vertically to the window frame.

With the use of remanence, two magnet devices may be used, of which the first magnetic field unit is a magnetic field unit with steel core, coil and flow channel. The second magnetic field unit is a remanence system with remanence material in the core and/or in the rest of the magnetic circuit. If a high damping force is required over a relatively long period of time, the remanence material is magnetized by means of a corresponding electrical current pulse (or electrical current pulse profile). After the renewed application of an electrical current pulse or electrical current pulse profile, the magnetic field is reduced again or eliminated entirely. When the door is closed, no remanence field, therefore easy opening possible in the event of an accident.

In the case of a flow of for example 0 to 3 amperes, the magnetic field can be generated as in a "normal" magnetic field unit. Increasing current=greater magnetic field=greater damping force. All of this continuously variable and very rapid (<10 ms).

Electrical current pulses or electrical current pulse profiles of for example 5 to 6 amperes remagnetize the remanence material, whereby a residual magnetic field remains. In this way, a (high) holding force can be generated without a supply of electrical current.

In all embodiments, it is also possible for an active system to be used.

Here, the following problem arises. The automatic opening and closing of the doors, as is the case nowadays with luggage compartments, will become established. The use of the current luggage compartment closing mechanisms (spindle drives) in the driver's or front passenger's door will not be desired, because these are far too slow (the customer does not wish to wait several seconds before being able to embark) and are very loud. Furthermore, in the event of an accident, the system cannot be opened (very high forces required in the electrically deenergized state). If the spindle drive also then deforms, the door no longer opens at all. Furthermore, the door forces are very high in relation to the luggage compartment cover (100 Nm when the automobile is in an inclined position). In the case of the luggage compartment cover, a gas spring or the gravitational force assists during the closing process.

In all embodiments, it is possible to use nitrogen or argon or large-molecule gases, which are less volatile, as actuator medium or as compressible medium in for example the compensation volume.

Gas dampers from the prior art generally have the problem in vehicles that, owing to the temperatures, the forces change significantly (gas volume; low temperatures—lower pressure; high temperatures—higher pressure). This yields differences in the characteristics. In the case of the invention with a magnetorheological damper device, temperature compensation is preferably performed. In all embodiments, it is therefore preferably possible to compensate an (outside) temperature. For this purpose, it is for example possible for the electrical coil to be additionally electrically energized, and thus for the damper device to be heated. It is however also possible for a separate heating device (only for low temperatures) to be installed, for example a heating wire, a heating sleeve around the damper device etc. The heating device may be activated for example when the user enters the vicinity of the vehicle, that is to say at an early time (Keyless Go . . . ) or uses the door. The heating device may however also be programmed (e.g. mornings . . . ).

Preferably, the door component comprises an electrical lock. A "soft close" facility is possible, wherein the door closes automatically in the final millimeters. This is preferably actuated in the reverse manner, that is to say the door is released (and the lock opened). The door is preferably then automatically opened, for example by virtue of the adaptive damper pushing the door open. The driver can thus open the door, in order to embark, using a smart device (mobile telephone, smart watch . . . ) or a radio key. The driver does not need to touch the door for this purpose, which, aside from the increased comfort, also has the advantage that the driver does not need to make his or her hands dirty, because the user indeed no longer has to touch the door in order to open it. It is also conceivable for the user to open the door by means of gesture control (for example a foot movement at/under the door), which is advantageous if the user has his or her hands full (for example after shopping). Furthermore, the user can embark directly, in particular if he or she approaches the vehicle from behind (the rear).

It is possible for only one door (for example the driver's door or the rear doors) to be equipped with the invention.

In current vehicles from the prior art, the door hinges are in some cases mounted (door kinematics) such that the door moves more easily in one direction than in the other. This can be compensated by means of the door component according to the invention.

It is now possible to use an active system with an MRF pump, in the case of which an MRF valve is used as a pump. The drive motor can be driven in both drive directions. Depending on the direction of rotation of the motor, a cylinder connected thereto is retracted or deployed. To realize control of the cylinder speed, the MRF valve can divert 0% to 100% of the volume flow via a bypass.

In all embodiments, it is possible in the context of the present invention for the relatively broad expression "door device" to be restricted to the more specific expression "door", and for the expressions to be correspondingly interchanged. Furthermore, in all embodiments, it is possible for the invention to be concretized as a pivotable door or pivotable flap or a pivotable lid such as a rear lid. In this context, a movable door device comprises a pivotable door, and may be restricted thereto or concretized as such, such that, throughout the entire description, the expression "movable" may be rendered more precisely as "pivotable". Conversely, the expression "door" may be replaced by "door device", and the expression "pivotable" may be replaced by "movable".

It is also possible for an opening and/or closing movement of a top of a cabriolet to be damped using the invention. In such embodiments, the movable top is to be regarded as a door device, and the entire structure with the supporting structure and the top held thereon is to be regarded as a door component.

The invention is not restricted to use in automobiles, and may also be used in for example trucks/heavy goods vehicles; agricultural vehicles, other (motor) vehicles, autonomous vehicles, taxis, items of furniture, aircraft and military vehicles.

It is also possible for an opening and/or closing movement of a top of a cabriolet, for example, to be damped using the invention. In such embodiments, the movable top is to be regarded as a door device, and the entire structure with the supporting structure and the top held thereon is to be regarded as a door component. The applicant reserves the right to direct a claim to a vehicle apparatus or other apparatus in which a movable device is held on a supporting structure so as to be movable between an open position and a closed position and in the case of which the movement can be damped by means of a magnetorheological damper device.

The invention is also directed to a damper device having a magnetorheological fluid as working fluid, which damper device comprises two connector units which are movable relative to one another, wherein a relative movement of the two connector units relative to one another can be damped (in controlled fashion). Said damper device according to the invention comprises a piston unit or piston device and a cylinder unit surrounding the piston unit, wherein the piston unit divides a cylinder volume into two chambers. Here, the piston unit has a first piston rod extending through the first chamber, and a second piston rod extending through the second chamber.

Said damper device according to the invention has numerous advantages. The damper device according to the invention may be used in a door component according to the invention. Use in other apparatuses and devices is however also possible.

The piston unit preferably has a magnetorheological damping valve with at least one flow channel.

In particular, a compensation chamber of a compensation device is formed at least partially or entirely within the piston rod.

The compensation device preferably comprises a separating piston. The separating piston of the compensation device is preferably arranged within the piston rod.

The compensation device advantageously comprises an automatic closing valve. The closing valve comprises, in particular, a closing piston within the piston rod.

It is preferable for the closing piston to be preloaded into an open position by a preload device. A preload device of said type may be formed for example by a gas spring in the compensation device. For example, the closing piston may have a dedicated piston rod which is preloaded into the deployed position by the (low) gas pressure of the gas spring. If, however, the pressure in the MRF on the other side of the closing piston in the associated chamber of the damper device is increased, then the closing piston automatically closes.

Refinements are preferable which have one feature or several features of the door component described above. The applicant reserves the right to separately claim damper devices described with reference to a door component.

Further advantages and features of the present invention will emerge from the description of the exemplary embodiments, which will be discussed below with reference to the appended figures.

DESCRIPTION OF THE INVENTION

Figure 1:
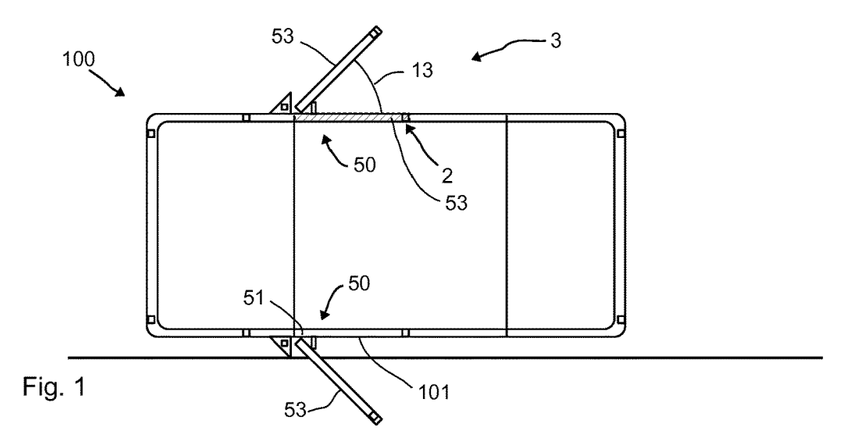
FIG. 1 shows a schematic plan view of a vehicle with a door component according to the invention.

FIG. 1 shows a schematic plan view of a motor vehicle 100 stopped at the edge of a road, in which motor-vehicle there are provided in this case two door devices 53 designed as doors, which are both open. The doors are situated in each case approximately in an angular position 13. The doors are each part of a door component 50, which in this case comprises the doors 53. It is equally possible for a door 53 to be attached to the door component 50. Each door component 50 comprises a damper device 1. The door component 50 or the damper device 1 comprises, in any case, connector units 51 and 52 for connection to the supporting structure 101 of the vehicle 100 and to the door 53, for the purposes of holding the door pivotably on the supporting structure 101. Here, the door may be composed of multiple units, which are in each case pivotable and which are articulatedly connected to one another. The door may be held so as to be pivotable about one or two or more pivot axes. Hatching is used to show a door 53 in the closed position 2, in which the door in this case terminates flush with the vehicle.

Figure 2:
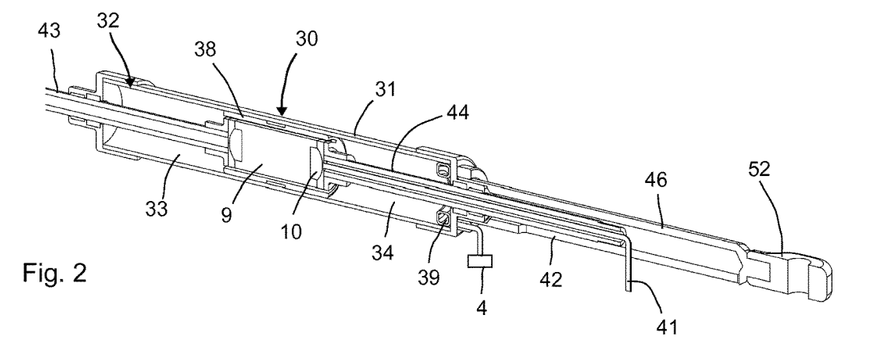
FIG. 2 shows a schematic sectional view of a damper device.

FIG. 2 shows, in an enlarged illustration, a damper device 1 that is preferably used in the door component 50 in FIG. 1. The damper device 1 has a damper which operates on a magnetorheological basis.

The door component 50 or the damper device 1 in FIG. 2 has connector units 51 and 52 for connection to the supporting structure 101 and to the door 53, in order a defined and controlled pivoting of the door during the movement from the open position illustrated in FIG. 1 into the closed position 2 also indicated in FIG. 1.

The damper device 1 comprises a cylinder unit 31, in which the piston 38 of the piston unit 30 divides the cylinder volume 32 into a first chamber 33 and a second chamber 34 in a variable manner.

To the piston rod 43 or 44 there may be attached a sensor device 12, by means of which an absolute position or relative movement of the damper device 1 can be detected. By interrogation of the sensor device, the position of the two connector units 51 and 52 with respect to one another can be detected, such that, by means of the sensor device, the position or the angular position of the door 53 is also directly detected.

The connector cables 62 for the electrical coil 10 in the piston 38 (and the sensor device 12) are in this case guided through the piston rod 44 to the outside. The connector cables 62 are in this case connected to the control device 4. By way of example for all exemplary embodiments, a schematic control device 4, by means of which the damping valve 5, the damper device 1 and/or the door component 50 as a whole can be controlled, is shown in FIG. 2. The control device 4 may also be part of the vehicle 100 or of some other apparatus.

FIG. 2 shows a damper device 1 with a continuous piston rod or with two separate piston rods 43, 44, which are in each case fixedly connected to the piston 38. The interior of the cylinder unit 31 is divided by the piston 38 into two chambers 33 and 34. The passage points are sealed off by means of suitable seals. Here, the two piston rods 43 and 44 are guided to the outside at the respective ends, such that there is no need for a plunging-in of the volume of a piston rod to be compensated, even when the piston 38 moves back and forth.

To be able to compensate a change in volume of the magnetorheological fluid or of the magnetorheological liquid as a result of temperature differences, a compensation device 39 is provided here, which is designed for example as a hollow rubber ring or the like, and which thus provides corresponding volume compensation by way of a volume expansion or decrease in volume as a result of temperature differences. Such a compensation device may be arranged in the chamber 33 or in the chamber 34. Compensation devices in both chambers 33 and 34 are possible.

In all embodiments, the piston 38 is also designed as a damping valve 5, and has one or two or more flow channels 7 which connect the first chamber 33 to the second chamber 34. The chambers 33 and 34 are filled with a magnetorheological fluid 6. The damping is in this case achieved by virtue of a magnet device 9 or at least one magnet device 9, which comprises an electrical coil and possibly magnetically hard material, being arranged on the damping valve 5.

By means of a short electrical pulse at the coil 10, a magnetic pulse can be triggered, which leads to a permanent magnetization of a magnet device 9 comprising magnetically hard material, such that, subsequently, the flow resistance through the flow channel 7 increases in a manner corresponding to the intensity of the acting magnetic field 8.

By means of corresponding remagnetization of the magnet devices 9, it is thus possible to set any desired damping of the door movement of the door 53. It is furthermore possible, in addition to a permanently acting magnetic field, to use the coil 10 to dynamically model the magnetic field 8 of the magnet devices 9. By means of a magnetic field oriented in the same direction, the damping can be intensified, and by means of a correspondingly oppositely oriented magnetic field, the damping can be attenuated or even.

It is also possible and preferable for the magnetic field to be generated only by means of the electrical coil 10, and not to resort to remanence.

In this exemplary embodiment, the connector cable 42 or the connector cables 42 are guided to the outside through the piston rod 44. The piston rod 44 is displaceably received and guided in a tube 46. Here, at the end of the piston rod 44, the connector cable 41 is guided out of the piston rod and is guided to the outside through a slot 42 in the tube 46.

Figure 3:
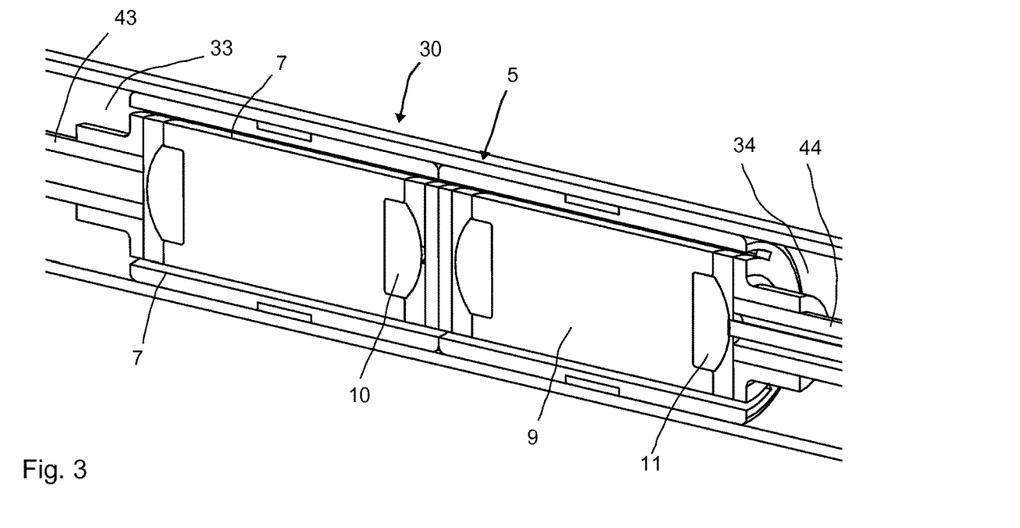
FIG. 3 shows an enlarged cross section of the damper device as per FIG. 2.

FIG. 3 shows a variant in which two magnet devices 9 or at least two electrical coils 10 and 11 are provided. The magnetic coils 10 and 11 of the magnet devices 9 are in turn arranged in the piston 38 of the piston unit 30 within the cylinder unit 31. In this case, too, the piston separates two chambers 33 and 34 of the cylinder volume 32. First and second piston rods 43 and 44 are provided, and guided out of the cylinder unit 31, on both sides.

Here, an electrical coil 10, 11 is used for generating a magnetic pulse and for the permanent magnetization of the magnet device 9. The respective other electrical coil 11, 10 can be used for the modulation of the presently acting magnetic field.

FIGS. 4 to 7 show a further schematically illustrated variant of a damper device 1 of a door component 50 with connector units 51 and 52.

Figure 4:
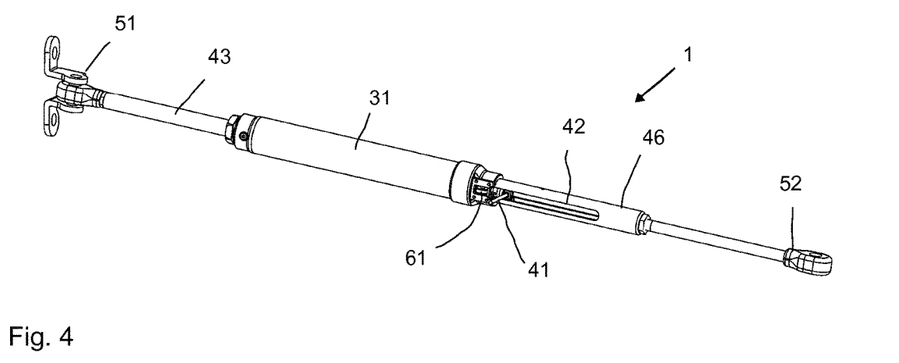
FIG. 4 is a perspective illustration of a further damper device for the door component as per FIG. 1.
Figure 5:
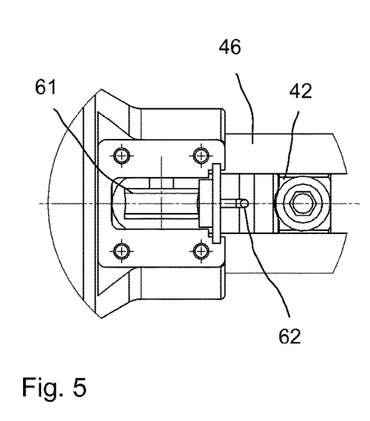
FIG. 5 shows an enlarged detail of a plan view of the damper device as per FIG. 4.
Figure 6:
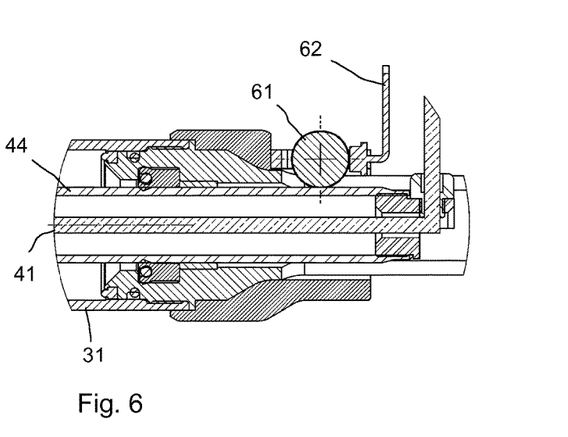
FIG. 6 shows an enlarged detail of a schematic section through the damper device as per FIG. 4.
Figure 7:
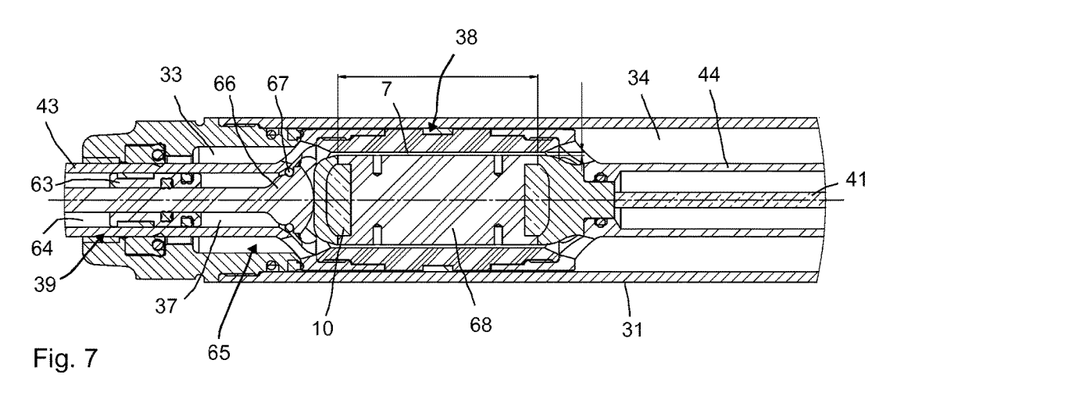
FIG. 7 shows an enlarged detail of a schematic section through the piston of the damper device as per FIG. 4.

FIG. 4 shows a perspective view. The damper device 1 has a magnetorheological fluid 6 as working fluid. FIGS. 5 to 7 show enlarged details. As shown in FIG. 7, a piston unit 30 with a piston 38 separates a first chamber 33 from the second chamber 34. At least one flow channel 7 leads through the piston. The magnetorheological fluid flows to the left from the first chamber 33 into the second chamber 34 during a movement of the piston, and from the second chamber 34 into the first chamber 33 during a reversed movement.

FIG. 4 shows a sensor device 12 which in this case comprises a friction wheel 61. The friction wheel 61 bears against the piston rod 44 (FIG. 6) and is rotated during a relative movement of the connector units 51, 52 with respect to one another, such that a detection of the position of the damper device 1 is made possible. An angular position of the door 53 can be derived therefrom. In all embodiments, it is however also possible for other travel sensors or angle sensors to be provided, for example at the rotary joint, such that an angular position is directly output.

In this case, too, an electrical coil 10 is used for the generation of a magnetic pulse and for the permanent magnetization of the magnet device 9. The same or another electrical coil may be used for the modulation of the presently acting magnetic field.

In FIG. 7, the compensation device 39 is arranged within one of the piston rods 43, 44, and in this case within the piston rod 43. The two piston rods 43, 44 are of hollow design and are in each case fixedly connected to the piston 38, in this case for example by screw connection. In the piston rod 43, there is formed a compensation chamber 37, which is closed at one end (not illustrated in any more detail here) and which is delimited at the other end by a closing valve 65. The closing valve 65 opens and closes as required, such that in each case identical conditions prevail in both movement directions. The gas volume 64 of the compensation device is separated from the compensation volume 36 by a separating piston 63. The separating piston 63 is preloaded by the gas volume 64, which is at a positive pressure. A small positive pressure of between 2 and 8 bar, in particular 2 to 5 bar, is sufficient here to permit reliable functioning.

If the piston 38 is moved to the left, such that the volume of the second chamber 44 is reduced, then—in a manner controlled by the magnetic field of the coil 10—the MRF flows through the flow channel 7 into the first chamber 43.

If the piston 38 is moved to the right, such that the volume of the second chamber 34 is reduced, then—in a manner controlled by the magnetic field of the coil 10—the MRF flows through the flow channel 7 into the first chamber 33. By means of the closing valve 65, it is ensured that the MRF does not flow into the compensation chamber, because the closing valve 65 has a closing piston which isolates the compensation chamber when the piston 38 is moved such that the volume of the first chamber 33 is reduced. This is preferably achieved in that the closing valve 65 has a widened head on which a seal 67 is provided. Owing to the increased pressure in the first chamber 33, the closing piston 66 retracts and the compensation chamber 37 is separated from the first chamber 33 by the seal 67. In this way, an identical action can be achieved during actuation in both directions.

Figure 8:
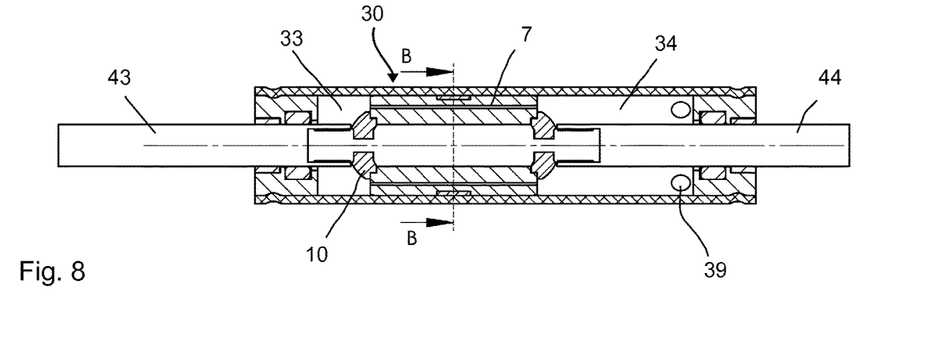
FIG. 8 shows a section through a further embodiment of a damper device.

FIG. 8 shows a variant of a damper device 1 for a door component 50 with a simple construction. Here, the two piston rods 43 and 44 are each of hollow design and are screwed onto, or fixedly connected in some other way to, the core equipped with a corresponding thread. The connector regions may, like the connector threads, be of flatter form in order to provide more structural space there for the electrical coil. The solid core offers good characteristics for the magnetic field.

In all embodiments, use is preferably made of an electrical coil in which the coil windings are wound substantially or entirely about an axis which runs transversely with respect to the longitudinal axis of the piston rods. Such an electrical coil is also referred to as a lying coil. This is by contrast to a coil wound concentrically about the piston rod. The flow channel is preferably of slot-like design. It is preferable for two symmetrically arranged flow channels to be provided.

Figure 9:
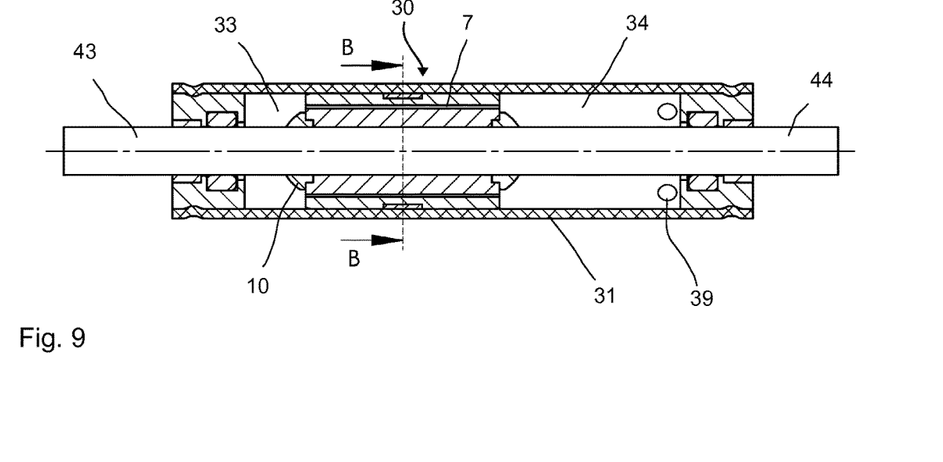
FIG. 9 shows a section through a yet further embodiment of a damper device.

FIG. 9 shows a variant of a damper device 1 for a door component 50 with a simple construction. Here, the two piston rods 43 and 44 are each of hollow design.

Figure 10:
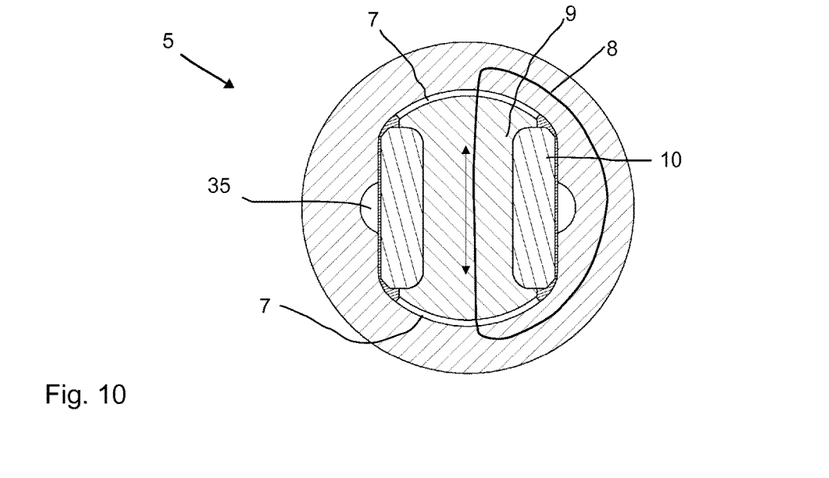
FIG. 10 shows a section through a damping valve.
Figure 11:
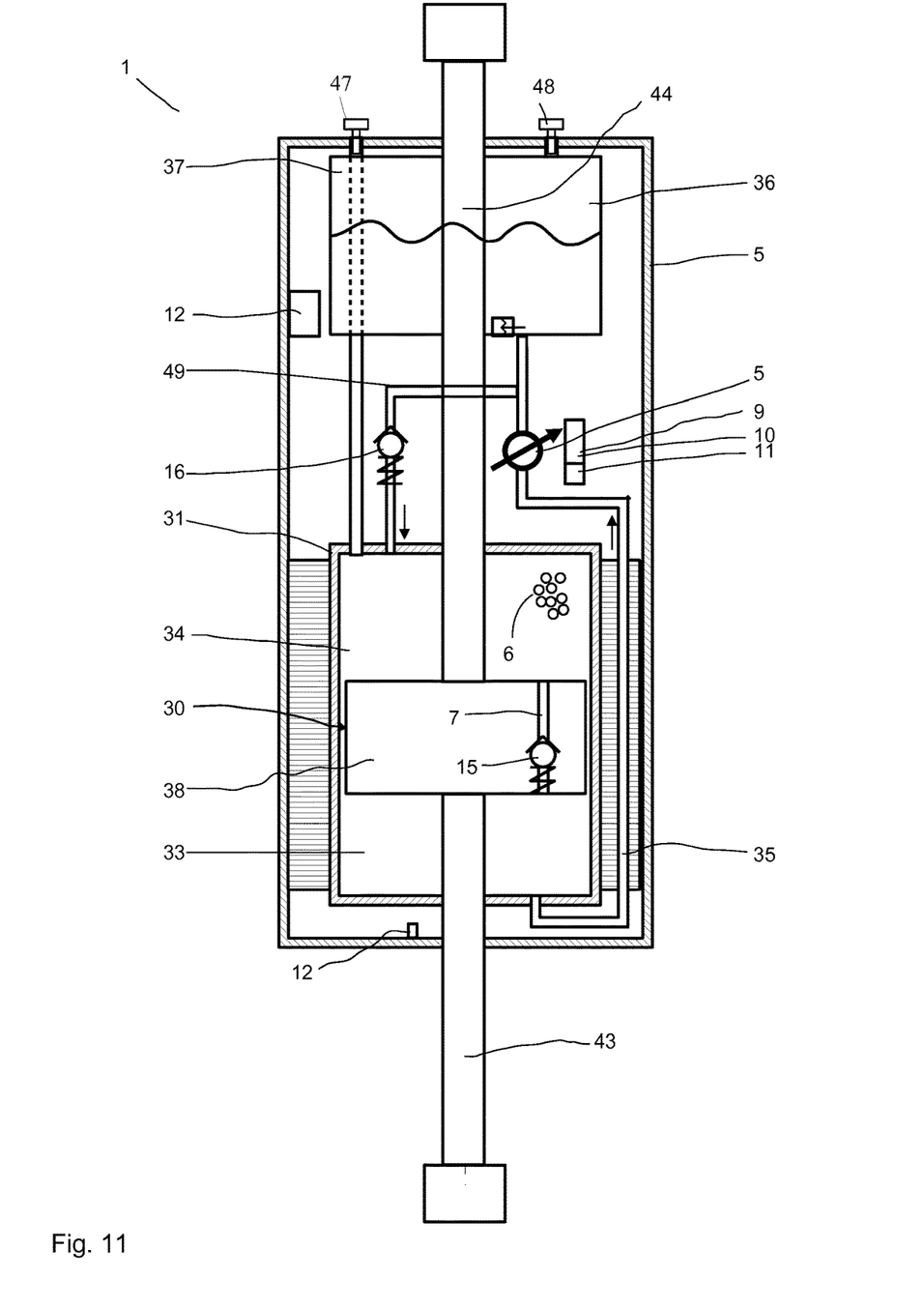
FIG. 11 is a schematic illustration of a further door component for the vehicle as per FIG. 1.

FIG. 10 shows a schematic cross section through a damping valve 5 for the damper device from FIG. 11.

FIG. 11 shows another schematically illustrated variant of a damper device 1 of a door component 50 having connector units 51 and 52. FIG. 10 shows the associated damping valve 5. The damper device 1 has a magnetorheological fluid 6 as working fluid. A piston unit 30 with a piston 38 separates a first chamber 33 from the second chamber 34. At least one flow channel 7 leads through the piston. The one-way valve 15 opens for the flow of the magnetorheological fluid from the second chamber 34 into the first chamber 33. From there, the working fluid is conducted through the return channel 35 to the in this case external damping valve 5, which is assigned a magnet device 9 and an electrical coil 10, in order to set the desired damping. The damping valve 5 is in turn connected in terms of flow to the second chamber 34 via a line 49 and a second one-way valve 16.

Both during the plunging of the piston rod 43 into the cylinder unit 31 and during the deployment of the piston rod 43 out of the cylinder unit 31, the working fluid 6 flows in the same direction along the indicated arrows.

The damper device 1 has one continuous piston rod or two separate piston rods 43, 44, which are guided out of the interior of the cylinder unit 31 to the outside at the respective ends. Again, the interior of the cylinder unit 31 is divided by the piston 38 into two chambers 33 and 34.

By virtue of the fact that the two piston rods 43 and 44 are guided to the outside at the respective ends, no volume compensation needs to be performed during the plunging-in of the volume of a piston rod.

To be able to compensate a volume expansion as a result of temperature differences, the compensation device 37 is again provided. It would also be possible for the compensation device 37 to be designed as a hollow rubber ring or the like, and can thus then provides corresponding volume compensation by way of a volume expansion or decrease in volume as a result of temperature differences. In the compensation chamber 37, there is provided a compensation volume 36, which is filled with a gas. A compensation device may also be arranged in the chamber 33 or in the chamber 34. It is possible for compensation devices to be provided in both chambers 33 and 34.

Valves 47 and 48 are provided for the filling of the first and second chambers 33, 34 and of the compensation chamber 37.

One or more sensor devices 12 may be provided in order to detect a relative position of the two connector units 51 and 52 with respect to one another, in order to derive an angular position of the door 53 therefrom. In all embodiments, it is however also possible for other angle sensors to be provided, for example at the rotary joint, such that an angular position is directly output.

Also, an electrical coil 10 is used for the generation of a magnetic field for the control of the damping action. With the electrical coil 10, it is also possible to output magnetic pulses and for the permanent magnetization of the magnet device 9. The same or another electrical coil may be used for the modulation of the presently acting magnetic field.

FIG. 10 shows a schematic cross section through a damping valve 5. In the case of the external damping valve 5, all of the parts shown are preferably immovable relative to one another. In the housing, it is possible to see the flow channels 7 of the damping valve 5, which may each also be divided further into two or more sub-channels by means of a partition. Also shown is a magnetic field line of the magnetic field 8. The magnetic field passes approximately perpendicularly through the flow channels 7 of the damping valve. The electrical coil 10 serves for the generation of a variable magnetic field, and in particular also for outputting a magnetic pulse in order to magnetize the magnet device 9 as desired. The damping valve 5 may also have return channels 35, which remain substantially uninfluenced by a magnetic field of the magnet device 9.

It is correspondingly also possible—without return channels 35—for a damping valve to be designed as piston 38 and to be used in a manner adapted to the embodiments described above. The housing then serves as piston 38. In any case, the magnetic field passes approximately perpendicularly through the flow channels 7 of the damping valve 5.

LIST OF REFERENCE DESIGNATIONS

1 Damper device
2 Closed position
3 Open position
4 Control device
5 Damping valve
6 MRF
7 Flow channel
8 Magnetic field
9 Magnet device
10 Electrical coil
11 Electrical coil
12 Sensor device
13 Angular position
14 Predetermined angular position
15 First one-way valve
16 Second one-way valve
18 Magnetic pulse
19 Time period
20 Rate of change
21 Delay
22 Rotational speed
23 Limit value of 20
24 Relatively low damping 25 Relatively high damping
26 Maximum damping
27 Damping
28 Closing speed
29 Second compensation channel
30 Piston unit
31 Cylinder unit
32 Cylinder volume
33 First chamber
34 Second chamber
35 Return channel
36 Compensation volume
37 Compensation chamber
38 Piston
39 Compensation device
40 Electrical connector unit
41 Connection cable
42 Slot
43 First piston rod
44 Second piston rod
45 Diameter of 43
46 Tube
47 Valve
48 Valve
49 Line
50 Door component
51 Connector unit
52 Connector unit
53 Door
54 Angular position
60 Obstruction
61 Friction wheel
62 Cable
63 Separating piston
64 Gas volume
65 Closing valve
66 Closing piston
67 Seal
68 Core
100 Vehicle
101 Supporting structure

The invention claimed is:

1. A door component, comprising:
a controllable, magnetorheological damper device containing a magnetorheological fluid forming a working fluid;
two connector units movably disposed relative to one another, said two connector units including a first connector unit to be connected to a supporting structure and a second connector unit to be connected to a movable door device for controllably damping a movement of the movable door device between a closed position and an open position;
said magnetorheological damper device including a piston unit and a cylinder unit surrounding said piston unit, said piston unit dividing a cylinder volume into a first chamber and a second chamber;
said piston unit having two piston rods, including a first piston rod extending through said first chamber and a second piston rod extending through said second chamber.

2. The door component according to claim 1, wherein said two piston rods project outwardly out of said cylinder volume and/or said cylinder unit.

3. The door component according to claim 1, wherein one of said two piston rods is a telescopic rod with a first side fastened to a piston of said piston unit and a second side fixedly connected to said cylinder unit.

4. The door component according to claim 1, wherein said damper device comprises a controllable damping valve with a flow channel for conducting a magnetorheological liquid therethrough, wherein said flow channel is to be subjected to a variable magnetic field so as to influence a flow resistance of said flow channel and a resulting damping action of said damper device by way of the magnetic field in said flow channel.

5. The door component according to claim 1, wherein said damper device comprises at least one compensation device with a compressible compensation volume.

6. The door component according to claim 5, wherein the compensation volume of said compensation device is smaller than a volume of said first piston rod and/or of said second piston rod within said cylinder unit.

7. The door component according to claim 1, wherein one of said two piston rods serves as an electrical connector unit and is connected to at least one connection cable guided to said piston rod.

8. The door component according to claim 1, which further comprises a tube formed with a slot, wherein at least one of said two piston rods is received, outside the cylinder unit, displaceably in said tube.

9. The door component according to claim 1, wherein said damper device comprises at least one sensor device having a part fastened to one of said piston rods, said sensor device having a friction wheel configured to detect a measure for a relative movement of said two connector units with respect to one another.

10. The door component according to claim 1 configured for a vehicle door of a vehicle and having a supporting structure, which comprises a position sensor configured to detect a measure for a deviation from a horizontal orientation of the vehicle, and a control device configured to control a damping action of said damper device in dependence on the deviation of the vehicle from the horizontal orientation.

11. The door component according to claim 10, which comprises at least one load sensor for detecting a load applied to the door and a at least one near-field sensor configured for identifying obstructions in a surroundings of the door.

12. The door component according to claim 1, wherein said piston unit is equipped with a first one-way valve, and wherein said first and second chambers are connected to one another by way of an external return channel that is equipped with a controllable magnetorheological damping valve, forming a one-way circuit conducting the magnetorheological fluid in one and the same flow direction through the piston unit during a retraction of the piston unit and a deployment of the piston unit.

13. The door component according to claim 12, wherein said first chamber is connected to said damping valve, and said damping valve is connected via a second one-way valve to said second chamber, and wherein a compensation volume is connected to said damping valve and to said second chamber.

14. A damper device, comprising:
two connector units movably disposed relative to one another;
a working fluid being a magnetorheological fluid and a controlled magnet device configured to damp a relative movement of said two connector units relative to one another;

a piston unit and a cylinder unit surrounding said piston unit, said piston unit dividing a cylinder volume into a first chamber and a second chamber; and said piston unit having a first piston rod extending through said first chamber and a second piston rod extending through said second chamber.

15. The damper device according to claim 14, wherein said piston unit includes a magnetorheological damping valve with at least one flow channel.

16. The damper device according to claim 14, which comprises a compensation chamber of a compensation device formed within said piston unit.

17. The damper device according to claim 14, wherein a separating piston of the compensation device is arranged within said piston rod.

18. The damper device according to claim 14, wherein said compensation device comprises an automatic closing valve.

19. The damper device according to claim 18, wherein said closing valve comprises a closing piston within said piston rod.

20. The damper device according to claim 18, wherein said closing piston is preloaded into an open position by a preload device.

\* \* \* \* \*